INVENTOR
GEORGE W. BAKER
BY
Hoppgood and Calimble
ATTORNEYS

United States Patent Office 3,305,288
Patented Feb. 21, 1967

3,305,288
MINIATURE ARC DISCHARGE TUBE
George W. Baker, Stamford, Conn., assignor to York Research Corporation, Stamford, Conn., a corporation of Delaware
Original application July 3, 1961, Ser. No. 121,450. Divided and this application June 14, 1963, Ser. No. 292,514
5 Claims. (Cl. 316—16)

This application is a division of my copending application Serial No. 121,450, filed July 3, 1961, now Patent No. 3,138,732, entitled Miniature Arc Discharge Tube.

This invention relates to a sub-miniature metallic gas diode of the arc-discharge type.

More specifically, the invention relates to a novel method of depositing and activating electron-emitting material, and to the construction of the tube.

Still more specifically, this invention relates to the method and construction of a gas diode capable of breaking-down at low voltages, e.g. in the range of 100–125 volts.

Gas-discharge or arc-discharge tubes are of course well known in the electronics industry. In recent years considerable research has been made in the development of miniature or sub-miniature gas diodes which reliably break down at substantially a predetermined voltage. There has also been considerable effort devoted to the development of a gas tube which reliably and consistently breaks down at a predetermined low voltage. In addition to the above requirements, the industry has also strived to develop a sub-miniature gas diode which is capable of drawing high current pulses, e.g. of the order of 100 amperes.

Accordingly, it is a primary object of the invention to provide a sub-miniature gas diode which satisfies each of the above requirements.

It is a further object of the invention to provide a novel method for making such a gas diode.

It is a further object of the invention to provide a novel method for depositing electron-emitting material on the cathode of the tube.

It is still another object of the invention to provide a novel method for activating the electron-emitting material deposited on the cathode.

In accordance with an aspect of the invention, there is provided a method for making an arc-discharge gas tube comprising depositing crystals from a compound consisting of an alkalide-halide on a surface of the cathode of the tube, charging the tube with one or a mixture of gases selected from the group of ionizable gases, sealing the tube against atmospheric pressure, and decomposing the compound by subjecting the electrodes to a series of current pulses of sufficient amplitude to convert the alkalide to its elemental state, so that it may serve as an active electron emitter.

In accordance with another aspect of the invention, there is provided a novel arc-discharge gas diode made in accordance with the above described process.

The above mentioned and other features and objects of this invention and the manner of attaining them will become more apparent and the invention itself will be best understood by reference to the following description of an embodiment of the invention taken in conjunction with the accompanying drawing, wherein.

Figure 1:
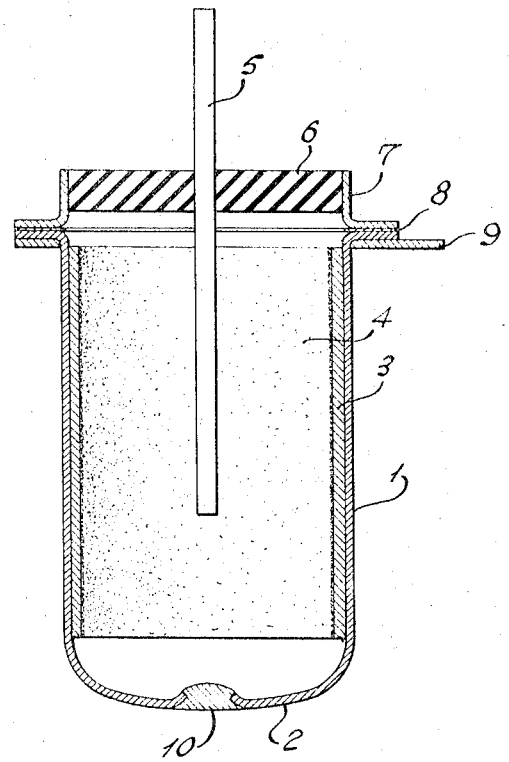
FIG. 1 is a cross-section of the novel gas-discharge tube.

Referring first to FIG. 1, the arc-discharge gas diode comprises a metal envelope 1, which is preferably made of Kovar but which could be made of any suitable electrode material such as nickel, 1010 steel, iron, copper, etc. Kovar is preferred because it may easily be sealed to glass.

The envelope is in the form of a cylinder substantially closed at one end 2, and opened at the opposite end.

A cathode in the form of a close-fitting cylinder 3 is secured to the inside of the envelope 1 by means of welding. The material of the cathode 3 must have an affinity for alkali crystals and is preferably nickel. Nickel is easily welded to the Kovar envelope 1 and has an excellent affinity for adhesion with alkali halide crystals such as potassium chloride.

Potassium chloride crystals, as suggested by the dashed 4, are deposited on the inside surface of the cathode cylinder 3 in accordance with a novel method which will be described later. The cathode surface is not completely covered with the crystals, but rather the crystals are interspersed on the surface forming discrete boundaries with the metal surface. The great number of independent crystal-metal boundaries is believed to contribute materially to the capabilities of the active cathode.

An anode electrode 5, preferably in the form of a rod, is sealed to a glass disc 6 and disposed centrally of the cathode cylinder 3. The glass disc 6 is contained within a Kovar annulus 7, which is welded to a flange 8 of the envelope 1. In other words, the anode 5 is sealed by means of a glass-to-metal seal to the envelope 1. An eyelet tab 9 for the cathode connection is attached to one side of the flange 8 by means, for example, of soldering. The tube is filled with an inert ionizable gas such as argon or neon, or preferably a mixture of a small percentage of argon in neon for a low voltage breakdown. The tube is evacuated and filled with the inert gas through an opening in the end 2 of the envelope 1, and after conventional tube processing, the opening is sealed as suggested at 10.

It is recalled that a primary object of the invention is to provide a sub-miniature gas diode which is capable of consistently discharging at substantially a predetermined low voltage. By "low voltage," it is meant between 100–125 volts, and by "substantially at a single predetermined voltage," it is meant within .5 volts of a voltage within this low voltage range. In other words, if a tube is designed to break down at 110 volts, to satisfy the requirements of the invention, it must break down consistently between 109.5 v. and 110.5 v.

To accomplish these requirements, the tube is made in accordance with the following novel process. The nickel cathode 3 is inserted and welded to the inside of the envelope 1. The tube is then filled with a solution of an alkalide-halide and preferably a saturated solution of potassium chloride in methyl alcohol. The alcohol is evaporated in a dry normal atmosphere leaving the potassium chloride crystals adhering to the surface of the nickel cathode 3. It has been found that the potassium chloride adheres sufficiently to the surface of the nickel cylinder so as to obviate the necessity of any kind of binder. The tube is then evacuated and charged or filled with a mixture of .1 percent of argon in neon at 5–50 mm. Hg pressure. The exact pressure of the gas depends upon the dimensions of the tube and the breakdown voltage. The tube is then sealed as shown at 10. The novel process is also characterized by converting the potassium chloride into elemental potassium by subjecting the electrodes to current pulses of sufficient amplitude. By way of example, the electrodes are subjected to a few thousand pulses having an amplitude approximately of 100 amperes, each of about one microsecond duration. To state it another way, the energy is applied in the form of pulses, a typical value of the energy in each current pulse applied to activate the cathode is the discharge of a 1 μf. condenser charged to 100 volts, or other combination of capacitance (C) and charge voltage (E), such that $CE^2=10,000$ where C is in microfarads and E is in volts. The precise number of pulses is determined empirically by testing the tube for breakdown voltage and observing the energy transfer which should be in the form of an arc-discharge.

The potassium chloride is decomposed whereby free potassium appears and the chlorine is gettered out by recombination with the metal of the tube. The potassium, of course, is the active electron-emitter material and, as well known, is a low work function material.

Figure 2:
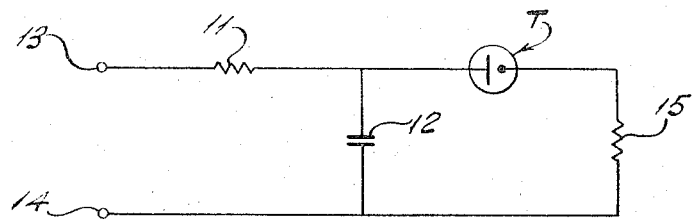
FIG. 2 is a schematic diagram of a firing circuit employing the novel gas-discharge tube.

In FIG. 2 there is illustrated a circuit which utilizes the novel gas discharge tube. The circuit is a timing device which is more accurate than the ordinary electronic clocks and much more rugged. The firing circuit comprising a charging circuit consisting of a resistor 11 and a capacitor 12, the input voltage being applied across terminals 13–14. The tube T will fire only when the stored charge on capacitor 12 exceeds the threshold level for breakdown. The discharge is through the load resistor 15. Thus, the circuit will fire at a predetermined time after the application of voltage to terminals 13 and 14.

In addition to the unique features mentioned above, the tube is capable of drawing high current pulses of the order of 100 amperes.

While the foregoing description sets forth the principles of the invention in connection with specific apparatus, it is to be understood that this description is made only by way of example and not as a limitation of the scope of the invention as set forth in the objects thereof and in the accompanying claims. For example, other gas fillings may be used, as helium for tubes with higher breakdown voltage, and other alkali halides may be employed such as caesium chloride.

Also the partial coating of alkali halide on the cathode metal surface may be applied by other means than by evaporation of a solution such as by the evaporation of the halide from a heated reservoir of halide.

What is claimed is:

1. A method of making an arc-discharge gas tube of the type having an anode and cathode, comprising depositing crystals from a compound consisting of an alkalide-halide on a surface of the cathode, in interspersed distribution charging the tube with one or a mixture of gases selected from the group of inert ionizable gases, sealing the tube against atmospheric pressure, and decomposing said compound by subjecting said electrodes to a series of current pulses of sufficient amplitude to convert the alkalide to its elemental state so that it may serve as an active electron emitter.

2. The method according to claim 1, wherein said crystals are applied to the cathode in solution, and depositing said crystals by evaporating said solution.

3. The method according to claim 1, wherein said alkalide-halide consists of potassium chloride.

4. A method of making an arc-discharge gas tube of the type in which the tube is substantially cylindrical, comprising inserting a close-fitting nickel metal cylinder cathode within said tube and securing it therein, filling said tube with a solution of potassium chloride, evaporating said solution to leave a deposit of potassium chloride crystals on the surface of said nickel cylinder, in interspersed distribution charging said tube with an inert ionizable gas, inserting a rod-shaped anode centrally of said nickel cylinder, sealing said anode in said tube and said tube against atmospheric pressure, and decomposing said potassium chloride by subjecting said electrodes to a series of current pulses of sufficient amplitude to convert the potassium to its elemental state, whereby the potassium may serve as an active electron-emitter.

5. The method according to claim 4, wherein said ionizable gas comprises neon and a small addition of argon.

No references cited.

RICHARD H. EANES, JR., *Primary Examiner.*